US012560483B2

(12) United States Patent
Yoon et al.

(10) Patent No.: US 12,560,483 B2
(45) Date of Patent: Feb. 24, 2026

(54) APPARATUS FOR INSPECTING DISPLAY PANEL AND METHOD FOR INSPECTING DISPLAY PANEL

(71) Applicant: Samsung Display Co., Ltd., Yongin-si (KR)

(72) Inventors: Jooyoung Yoon, Suwon-si (KR); Yunseok Han, Asan-si (KR); Dowon Yi, Seoul (KR); Joo-Young Lee, Hwaseong-si (KR); Hyun-Koo Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 271 days.

(21) Appl. No.: 18/105,575

(22) Filed: Feb. 3, 2023

(65) Prior Publication Data

US 2023/0358612 A1 Nov. 9, 2023

(30) Foreign Application Priority Data

May 6, 2022 (KR) ........................ 10-2022-0055899

(51) Int. Cl.
*G01J 3/45* (2006.01)
*G01J 3/02* (2006.01)

(52) U.S. Cl.
CPC ................. *G01J 3/45* (2013.01); *G01J 3/021* (2013.01)

(58) Field of Classification Search
CPC . G01J 3/45; G01J 3/021; G01N 21/45; G01N 21/23; G01N 2021/216; G01N 2021/8848; G01N 21/95; G01N 2021/9513; G01N 21/8806; G01N 21/958; G01N 21/8851; G01N 2021/8809; G01N 2021/8845
See application file for complete search history.

(56) References Cited

U.S. PATENT DOCUMENTS

2003/0160968 A1* 8/2003 Deck .................. G01B 9/02021
356/515
2011/0144505 A1* 6/2011 Yamamoto ............. G01B 11/24
356/369

FOREIGN PATENT DOCUMENTS

JP 2012208180 A * 10/2012
KR 20080053542 A * 6/2008
KR 101274517 B1 6/2013

* cited by examiner

*Primary Examiner* — Michelle M Iacoletti
(74) *Attorney, Agent, or Firm* — CANTOR COLBURN LLP

(57) ABSTRACT

An apparatus for inspecting a display panel includes a light source, a half mirror reflecting a first beam which is a portion of a source beam irradiated from the light source and transmitting a second beam which is another portion of the source beam toward a display panel, a reflective mirror reflecting the second beam transmitting the half mirror and the display panel to return to the half mirror, a panel supporter supporting the display panel between the half mirror and the reflective mirror, a wave plate disposed between the half mirror and the reflective mirror and transmitting the second beam, a rotator rotating the wave plate at a predetermined angle and an imaging detector photographing an interference fringe by the first beam and the second beam.

8 Claims, 4 Drawing Sheets

APPARATUS FOR INSPECTING DISPLAY PANEL AND METHOD FOR INSPECTING DISPLAY PANEL

This application claims priority to Korean Patent Application No. 10-2022-0055899, filed on May 6, 2022, and all the benefits accruing therefrom under 35 U.S.C. § 119, the content of which in its entirety is herein incorporated by reference.

BACKGROUND

1. Field

Embodiments relate to an apparatus for inspecting a display panel and a method for inspecting a display panel. More particularly, embodiments relate to an apparatus and a method for inspecting the display panel including a light-transmitting area.

2. Description of the Related Art

The flat panel display is being used as a display device that replaces a cathode ray tube display due to characteristics such as light weight and thinness. Representative examples of such flat panel display device include a liquid crystal display device and an organic light-emitting display device.

The display device may include a display panel and a functional module. The display panel may include a light-transmitting area that transmits incident external light. The functional module, such as a camera module or a sensor module disposed on a rear surface of the display panel may sense or recognize an object, a user, and the like positioned in front of the display panel through the light-transmitting area. Therefore, it is desired to inspect a manufacturing state of the light-transmitting area of the display panel.

The manufacturing state of the light-transmitting area of the display panel may be inspected through an interference fringe. Interference fringe analysis is a method using a light interference signal expressed in a bright and dark form according to the optical path difference of the two lights when the light that starts at the same time from an arbitrary reference point moves through different optical paths and then merges. The interference fringe may be detected through an imaging apparatus such as a charge-coupled device ("CCD") camera.

SUMMARY

Embodiments provide an apparatus for inspecting a display panel with improved inspection accuracy and reduced inspection time.

Other embodiments provide a method for inspecting a display panel with improved inspection accuracy and reduced inspection time.

An apparatus for inspecting a display panel in an embodiment may include a light source, a half mirror reflecting a first beam which is a portion of a source beam irradiated from the light source and transmitting a second beam which is another portion of the source beam toward a display panel, a reflective mirror reflecting the second beam transmitting the half mirror and the display panel to return to the half mirror, a panel supporter supporting the display panel between the half mirror and the reflective mirror, a wave plate disposed between the half mirror and the reflective mirror and transmitting the second beam, a rotator rotating the wave plate at a predetermined angle and an imaging detector photographing an interference fringe by the first beam and the second beam.

In an embodiment, the panel supporter may fix the display panel not to rotate.

In an embodiment, the imaging detector may photograph the interference fringe by the first beam and the second beam, wherein the first beam is reflected by the half mirror, and the second beam transmits the half mirror, the wave plate, and the display panel, is reflected by the reflective mirror, and again transmits the display panel, the wave plate, and the half mirror.

In an embodiment, the imaging detector may acquire a first image obtained by photographing an interference fringe by the first beam and the second beam before the wave plate is rotated at the predetermined angle, and acquire a second image obtained by photographing an interference fringe by the first beam and the second beam after the wave plate is rotated at the predetermined angle.

In an embodiment, the wave plate may be disposed between the half mirror and the display panel.

In an embodiment, the wave plate may be disposed between the display panel and the reflective mirror.

In an embodiment, the light source may irradiate the circularly polarized source beam.

In an embodiment, the reflective mirror may be inclined with respect to the half mirror.

A display device in an embodiment may include irradiating a source beam toward a half mirror, acquiring a first image photographing an interference fringe by a first beam and a second beam, wherein the first beam is a portion of the source beam reflected by the half mirror, and the second beam is another portion of the source beam transmitting the half mirror, a wave plate, and a display panel and reflected by the reflective mirror, and again transmitting the display panel, the wave plate, and the half mirror, rotating the wave plate at a predetermined angle and acquiring a second image photographing an interference fringe by the first beam and the second beam, after the wave plate is rotated.

In an embodiment, the display panel may be fixed not to rotate.

In an embodiment, the second beam transmitting the half mirror, may sequentially transmit the wave plate and the display panel and be reflected by the reflective mirror.

In an embodiment, the second beam transmitting the half mirror, may sequentially transmit the display panel and the wave plate and be reflected by the reflective mirror.

In an embodiment, the irradiating the source beam may include irradiating the circularly polarized source beam toward the half mirror.

In an embodiment, the reflective mirror may be inclined with respect to the half mirror.

In the apparatus for inspecting the display device in embodiments of the disclosure, in a state in which the display panel is fixed not to be rotated, the apparatus may acquire the interference fringe image about the light-transmitting area of the display panel and rotate the wave plate having a predetermined period and disposed between the half mirror and the reflective mirror by a predetermined angle. Accordingly, the apparatus may prevent an image forming defect in which the interference fringe does not appear or appears faintly, while reducing the inspection time. Also, as the display panel is fixed, erroneous measurement due to vibration of the display panel may be prevented. Accordingly, the light-transmitting area of the display panel may be accurately inspected, and the inspection time may be reduced.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
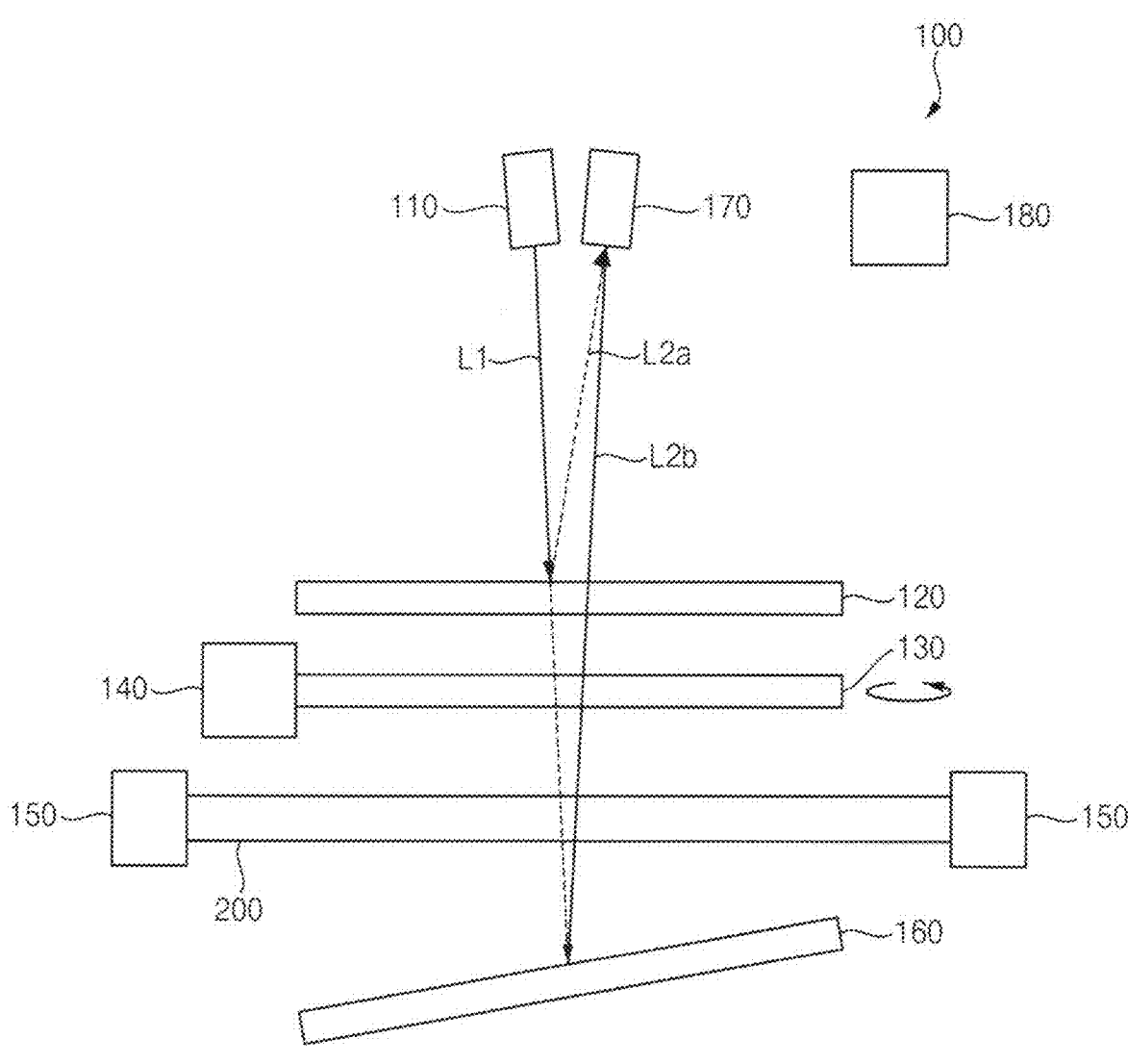
FIG. 1 is a configuration diagram schematically illustrating an embodiment of an apparatus for inspecting a display panel.

Hereinafter, display devices in embodiments will be described in more detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within $\pm 30\%$, 20%, 10%, 5% of the stated value, for example.

The term "unit" as used herein may be intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a configuration diagram schematically illustrating an embodiment of an apparatus for inspecting a display panel.

Referring to FIG. 1, an apparatus for inspecting a display panel 100 in an embodiment of the disclosure may include a light source 110, a half mirror 120, a wave plate 130, a rotator 140, a panel supporter 150, a reflective mirror 160, an imaging detector 170, and an analysis unit 180.

The apparatus for inspecting the display panel 100 may inspect the display panel 200. The display panel 200, which is an inspection object of the apparatus for inspecting the display panel 100, may include a light-transmitting area having light transmittance. The apparatus for inspecting the display panel 100 may inspect a manufacturing state of the light-transmitting area of the display panel 200. In more detail, the apparatus for inspecting the display panel 100 may analyze an interference fringe by a reference beam (e.g., L2a of FIG. 1) that does not transmit the display panel 200 and the measurement beam (e.g., L2b of FIG. 1) transmitting the light-transmitting area of the display panel 200 among a source beam (e.g., L1 of FIG. 1) irradiated from the light source 110. Accordingly, the apparatus for inspecting the display panel 100 may inspect the manufacturing state of the light-transmitting area of the display panel 200. This will be described later in detail.

The light source 110 may generate a source beam L1 and irradiate the source beam L1 toward the half mirror 120. In an embodiment, the source beam L1 irradiated from the light source 110 may be a circularly polarized beam, but the disclosure is not limited thereto.

The source beam L1 irradiated from the light source 110 may be incident to the half mirror 120. The half mirror 120 may reflect a portion of the incident light and transmit another portion of the incident light.

As shown in FIG. 1, the half mirror 120 may reflect a first beam L2a that is a portion of the source beam L1 irradiated from the light source 110, and a second beam L2b that is another portion of the source beam L1. That is, the half mirror 120 may separate the optical path of the incident source beam L1. As will be described later, the first beam L2a may be reflected from the half mirror 120 to be incident on the imaging detector 170. The second beam L2b may transmit the half mirror 120, the wave plate 130, and the display panel 200, be reflected by the reflective mirror 160, again transmit the display panel 200, the wave plate 130 and the half mirror, and be incident on the imaging detector 170. The first beam L2a incident to the imaging detector 170 may be also referred to as the reference beam, and the second beam L2b may be also referred to as the measurement beam. Also, when the second beam L2b transmits the display panel 200, it may be understood that the second beam L2b has light-transmitting properties and transmits the light-transmitting area of the display panel 200 to be inspected.

The wave plate 130 may be spaced apart from the light source 110 with the half mirror 120 interposed therebetween. The wave plate 130 may be disposed between the half mirror 120 and the reflective mirror 160. That is, the first beam L2a reflected from the half mirror 120 may not incident on the wave plate 130, and only the second beam L2b that has transmitted the half mirror 120 may be incident on the wave plate 130.

A polarization state of the second beam L2b incident on the wave plate 130 may be changed while transmitting the wave plate 130. The wave plate 130 may consist of various wave plates such as a quarter wave plate ("QWP") having a $\lambda/4$ plate characteristic and a half wave plate ("HWP") having a $\lambda/2$ plate characteristic.

Also, the wave plate 130 may include various materials. In an embodiment, the wave plate 130 may be a film wave plate including a polymer having a film shape, for example. However, the disclosure is not limited thereto, and the wave plate 130 may be a crystal wave plate including a crystal. When the wave plate 130 is a crystal wave plate, durability of the wave plate 130 may be improved.

In an embodiment, the wave plate 130 may be disposed substantially parallel to the display panel 200.

The wave plate 130 may be variously disposed between the half mirror 120 and the reflective mirror 160.

In an embodiment, as shown in FIG. 1, the wave plate 130 may be disposed between the half mirror 120 and the display panel 200. In this case, the second beam L2b transmitting the half mirror 120 may sequentially transmit the wave plate 130 and the display panel 200 to be reflected by the reflective mirror 160, and again transmit to the display panel 200 and the wave plate 130, and be incident on the half mirror 120.

In another embodiment, unlike shown in the drawings, the wave plate 130 may be disposed between the display panel 200 and the reflective mirror 160. In this case, the second beam L2b transmitting the half mirror 120 may sequentially transmits the display panel 200 and the wave plate 130 to be reflected by the reflective mirror 160, and then again transmit to the wave plate 130 and the display panel 200, and be incident on the half mirror 120.

The rotator 140 may rotate the wave plate 130 at a predetermined angle. In an embodiment, the rotator 140 may rotate the wave plate 130 at the predetermined angle about a rotation axis perpendicular to the upper surface of the wave plate 130, for example. The imaging detector 170 may photograph the interference fringe by the first beam L2a and the second beam L2b before and after the rotator 140 rotates the wave plate 130, respectively. Accordingly, the apparatus for inspecting the display panel 100 may prevent an image forming defect in which the interference fringe does not appear or appears faintly. In an embodiment, the angle at which the rotator 140 rotates the wave plate 130 may be set to an appropriate value so that the image formation is reversed according to the display panel 200 to be inspected, for example.

The rotator 140 may maintain a constant rotation angle of the wave plate 130. In an embodiment, a dial may be disposed under the wave plate 130, and the rotating angle of the wave plate 130 may be constantly maintained by measuring the rotating angle through the dial, for example. Accordingly, when the display panel 200 is inspected, the wave plate 130 may be rotated at the predetermined angle to ensure reliability of the inspection process.

The panel supporter 150 may support the display panel 200. The panel supporter 150 may support the display panel 200 such that the display panel 200 is disposed between the half mirror 120 and the reflective mirror 160.

In an embodiment, the panel supporter 150 may be fixed so that the display panel 200 is not rotated during the inspection process of the display panel 200.

The reflective mirror 160 may reflect the second beam L2b incident through the half mirror 120, the wave plate 130, and the display panel 200. The second beam L2b reflected by the reflective mirror 160 may transmit the display panel 200, the wave plate 130, and the half mirror 120 to be incident on the imaging detector 170.

In an embodiment, as shown in FIG. 1, the reflective mirror 160 may not be parallel to the half mirror 120. That is, the reflective mirror 160 may be inclined with respect to the half mirror 120. In an embodiment, the mirror adjustment unit (not shown) may adjust the number of the interference fringes by adjusting the angle of the reflective mirror 160 with respect to the half mirror 120, for example.

The first beam L2a and the second beam L2b in which an optical path is separated from the source beam L1 may be incident to the imaging detector 170. The first beam L2a may be reflected from the half mirror 120 to be incident on the imaging detector 170. The second beam L2b may transmit the half mirror 120, the wave plate 130, and the display panel 200, be reflected by the reflective mirror 160, again transmit the display panel 200, the wave plate 130 and the half mirror 120 and be incident on the imaging detector 170. The imaging detector 170 may image the interference fringe by the first beam L2a and the second beam L2b.

The imaging detector 170 may acquire a first image by photographing the interference fringe by the first beam L2a and the second beam L2b before the rotator 140 rotates the wave plate 130. Next, the imaging detector 170 may acquire a second image by photographing the interference fringe by the first beam L2a and the second beam L2b after the rotator 140 rotates the wave plate 130 at the predetermined angle. The angle at which the rotator 140 rotates the wave plate 130 may be set to an appropriate value according to the display panel 200 (e.g., according to product specifications) so that the interference fringe appears clearly in at least one of the first image and the second image. Accordingly, the apparatus for inspecting the display panel 100 may prevent the image forming defect in which the interference fringe does not appear or appears faintly.

The analysis unit 180 may analyze the interference fringes displayed in the first image and/or the second image acquired by the imaging detector 170 to inspect the manufacturing state of the light-transmitting area of the display panel 200. Specifically, the interference fringe expressed in a bright and dark form may appear according to an optical path difference between the first beam L2a and the second beam L2b separated from the source beam L1. The analysis unit 180 may calculate phase information from the interference fringe, and inspect a refractive index distribution and wavefront aberration of the light-transmitting area of the display panel 200 from the phase information.

Figure 2:
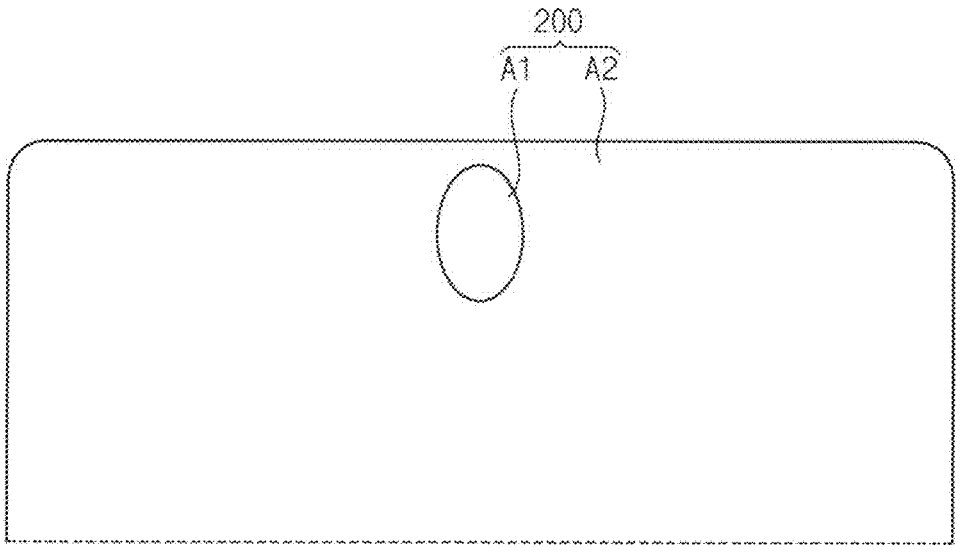
FIG. 2 is a plan view illustrating an embodiment of a display panel that is an inspection object of the apparatus for inspecting the display panel of FIG. 1.

FIG. 2 is a plan view illustrating an embodiment of a display panel that is an inspection object of the apparatus for inspecting the display panel of FIG. 1.

Referring to FIG. 2, the display panel 200 may have a first area A1 and a second area A2. Each of the first area A1 and the second area A2 may be a display area for displaying an image. The first area A1 may include a transmission area that transmits external light (e.g., transmission area TA of FIG. 3). As the first area A1 includes the transmission area, transmittance of the first area A1 may be higher than that of the second area A2. The first area A1 may transmit external light incident on the first area A1 while displaying an image. That is, the first area A1 may have light-transmitting properties as a whole. The first area A1 may be also referred to as a light-transmitting area.

The first area A1 of the display panel 200 may be an area in which a functional module is disposed on the rear surface. The functional module such as a camera module and a sensor module disposed on the rear surface of the display panel 200 may detect or recognize an object, a user, or the like disposed in front of the display panel 200 through the light-transmitting first area A1. Accordingly, since the performance of the functional module varies according to the manufacturing state of the first area A1 of the display panel 200, it is desired to inspect the first area A1 of the display panel 200.

Figure 3:
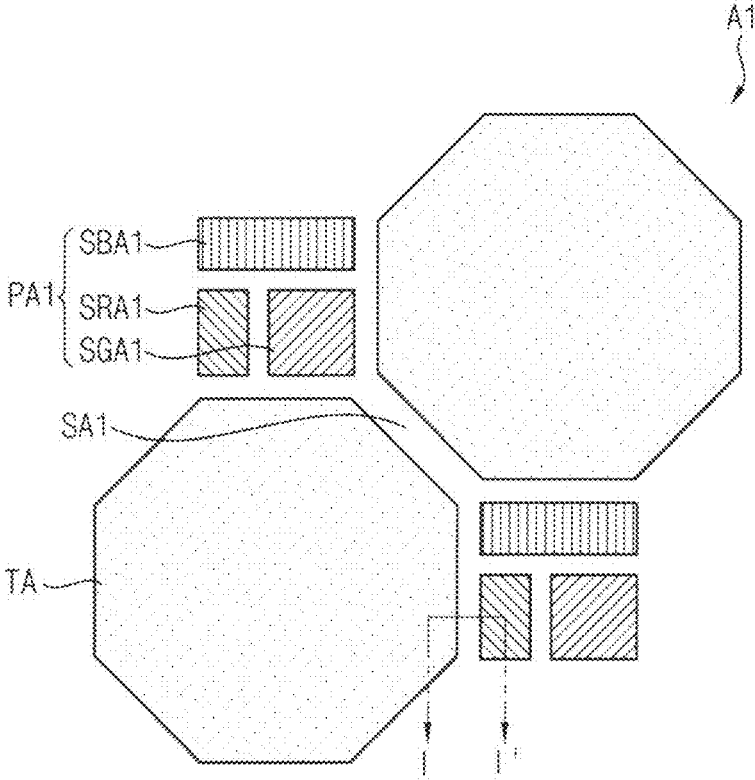
FIG. 3 is a plan view illustrating a first area of the display panel of FIG. 2.
Figure 4:
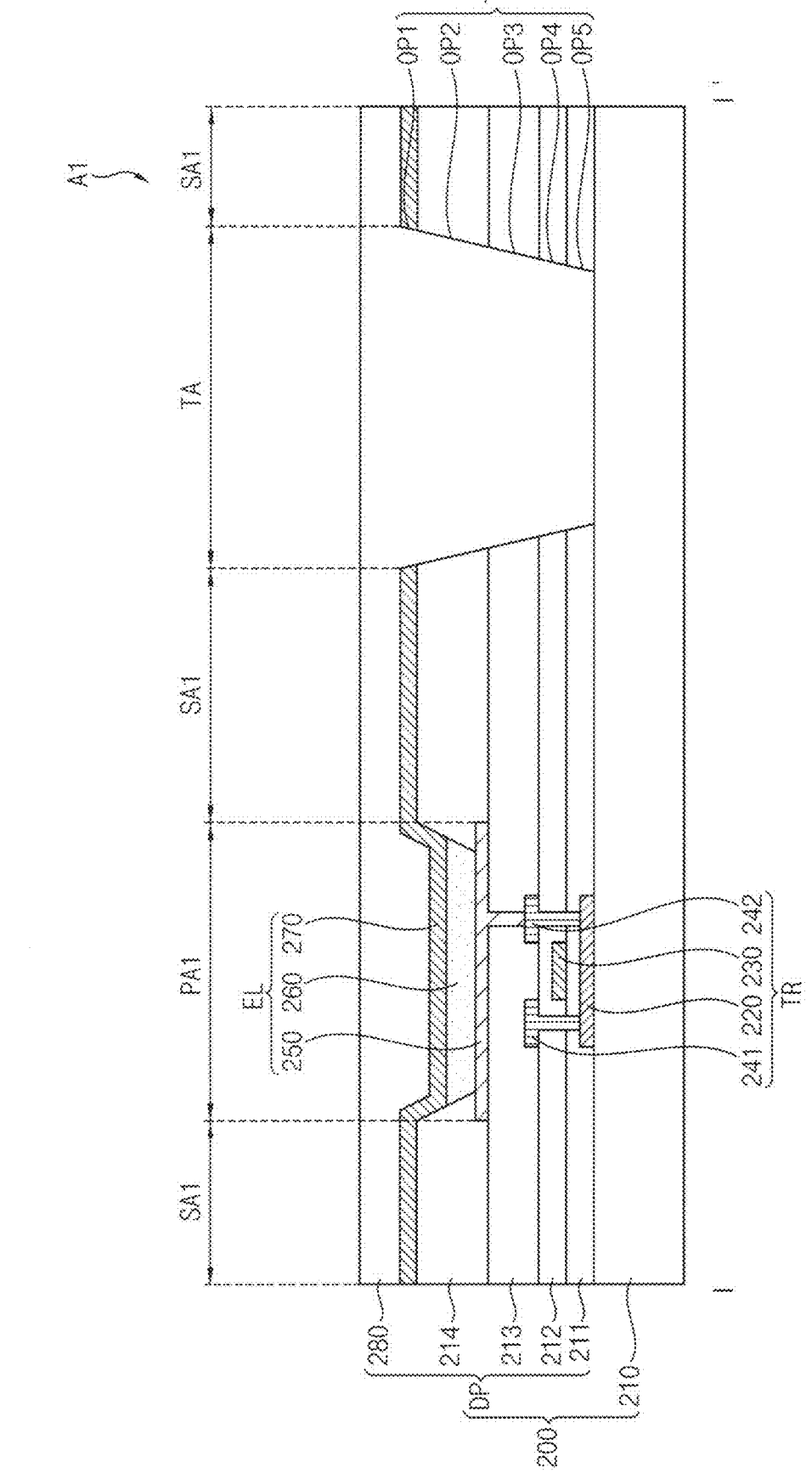
FIG. 4 is a cross-sectional view taken along line I-I' of FIG. 3.

FIG. 3 is a plan view illustrating a first area of the display panel of FIG. 2. FIG. 4 is a cross-sectional view taken along line I-I' of FIG. 3.

Hereinafter, with reference to FIGS. 3 and 4, among the first area A1 and the second area A2 of the display panel 200, the first area A1 to be inspected by the apparatus for inspecting the display panel 100 may be described in more detail.

Referring to FIG. 3, the first area A1 may include a first pixel area PA1, a transmission area TA, and a first peripheral area SA1. The first pixel area PA1 may be an area in which pixels are disposed and light generated from each of the pixels is emitted.

The first pixel area PA1 may include a plurality of first sub-pixel areas SRA1, SGA1, and SBA1 emitting light of different colors. In an embodiment, the first sub-pixel areas SRA1, SGA1, and SBA1 include a first red pixel area SRA1 emitting red light, a first green pixel area SGA1 emitting green light, and a first blue pixel area SBA1 emitting blue light.

The transmission area TA may be an area that transmits external light incident on the display panel 200. As the first area A1 includes the transmission area TA that transmits external light, the functional module disposed under the display panel 200 corresponding to the first area A1 may detect or recognize an object or a user disposed in front of the display device through the transmission area TA. The first peripheral area SA1 may surround the first pixel area PA1 and the transmission area TA. The first peripheral area SA1 may be an area in which light is not emitted and external light is not transmitted.

Referring to FIG. 4, in an embodiment, the display panel 200 may include a substrate 210 and a display unit DP. The display unit DP may include a plurality of conductive layers 220, 230, 241, and 242, a plurality of inorganic insulation layers 211 and 212, an organic insulation layer 213, a first electrode 250, and a pixel defining layer 214, an emission layer 260, a second electrode 270, and an encapsulation layer 280.

The substrate 210 may be a transparent insulating substrate. In an embodiment, the substrate 210 may include glass, quartz, plastic, or the like, for example.

Conductive layers 220, 230, 241, and 242 disposed in different layers may be disposed on the substrate 210. The conductive layers 220, 230, 241, and 242 may include an active layer 220, a gate electrode 230, a source electrode 241, and a drain electrode 242. The conductive layers 220, 230, 241, and 242 may be disposed in the first pixel area PA1 and the first peripheral area SA1.

The inorganic insulation layers 211 and 212 may be disposed on the substrate 210 to insulate the conductive layers 220, 230, 241, and 242 from each other by being disposed in different layers. The inorganic insulation layers 211 and 212 may include a gate insulation layer 211 and an inter-insulation layer 212.

The active layer 220 may be disposed on the substrate 210. The active layer 220 may include amorphous silicon, polycrystalline silicon, an oxide semiconductor, or the like. The active layer 220 may include a source region, a drain region, and a channel region disposed between the source region and the drain region. The source region and the drain region may be doped with a P-type or N-type impurity, and the channel region may be doped with an impurity of a different type from the impurities doped into the source region and the drain region.

The gate insulation layer 211 may be disposed on the active layer 220. The gate insulation layer 211 may cover the active layer 220 and may be formed on the substrate 210. The gate insulation layer 211 may insulate the gate electrode 230 from the active layer 220. The gate insulation layer 211 may include an inorganic insulating material such as silicon nitride, silicon oxide, or silicon oxynitride.

The gate electrode 230 may be disposed on the gate insulation layer 211. The gate electrode 230 may overlap the channel region of the active layer 220. The gate electrode 230 may include a conductive material such as a metal or a metal alloy. In an embodiment, the gate electrode 230 may include molybdenum (Mo), copper (Cu), or the like, for example.

The inter-insulation layer 212 may be disposed on the gate electrode 230. The inter-insulation layer 212 may cover the gate electrode 230 and may be formed on the gate insulation layer 211. The inter-insulation layer 212 may insulate the source electrode 241 and the drain electrode 242 from the gate electrode 230. The inter-insulation layer 212 may include an inorganic insulating material such as silicon nitride, silicon oxide, silicon oxynitride, or the like.

The source electrode 241 and the drain electrode 242 may be disposed on the inter-insulation layer 212. The source electrode 241 may be connected to the source region of the active layer 220, and the drain electrode 242 may be connected to the drain region of the active layer 220. The source electrode 241 and the drain electrode 242 may include a conductive material such as a metal or a metal alloy. In an embodiment, the source electrode 241 and the drain electrode 242 may include aluminum (Al), titanium (Ti), copper (Cu), or the like, for example. The active layer 220, the gate electrode 230, the source electrode 241, and the drain electrode 242 may form a transistor TR. The transistor TR may be disposed in the first pixel area PA1.

The organic insulation layer 213 may be disposed on the source electrode 241 and the drain electrode 242. The organic insulation layer 213 may be formed on the inter-insulation layer 212 to cover the source electrode 241 and the drain electrode 242. The organic insulation layer 213 may protect the transistor TR and provide a flat surface on the transistor TR. The organic insulation layer 213 may include an organic insulating material such as polyimide cm.

The first electrode 250 may be disposed on the organic insulation layer 213. The first electrode 250 may be connected to the source electrode 241 or the drain electrode 242. The first electrode 250 may be disposed in the first pixel area PA1. The first electrode 250 may include a conductive material such as a metal or a transparent conductive oxide.

The pixel defining layer 214 may be disposed on the first electrode 250. A pixel opening exposing a central portion of the first electrode 250 may be defined in the pixel defining layer 214 to define the first pixel area PA1. In addition, the pixel defining layer 214 may prevent generating an arc between the edge of the first electrode 250 and the second electrode 270 by separating the second electrode 270 from the edge of the first electrode 250. The pixel defining layer 214 may include an organic insulating material such as polyimide cm.

The emission layer 260 may be disposed on the first electrode 250. The emission layer 260 may be disposed on the first electrode 250 exposed by the pixel opening. The emission layer 260 may include at least one of an organic light-emitting material and quantum dots.

The second electrode 270 may be disposed on the emission layer 260. The second electrode 270 may also be disposed on the pixel defining layer 214. The second electrode 270 may face the first electrode 250 with the emission layer 260 interposed therebetween. The second electrode 270 may include a conductive material such as a metal or a transparent conductive oxide. The first electrode 250, the emission layer 260, and the second electrode 270 may form a light-emitting diode EL. The light-emitting diode EL may be disposed in the first pixel area PA1.

The display panel 200 may include a transmission window TW overlapping the transmission area TA. The transmission window TW may be defined as openings of components of the display panel 200 overlapping the transmission area TA. An opening overlapping the transmission area TA may be defined in at least one of the gate insulation layer 211, the inter-insulation layer 212, the organic insulation layer 213, the pixel defining layer 214, and the second electrode 270.

In an embodiment, a first opening OP1, a second opening OP2, a third opening OP3, a fourth opening OP4, and a fifth opening OP5 overlapping the transmission area TA may be defined in the second electrode 270, the pixel defining layer 214, the organic insulation layer 213, the inter-insulation layer 212, and the gate insulation layer 211, respectively. In this case, the first opening OP1 of the second electrode 270, the second opening OP2 of the pixel defining layer 214, the third opening OP3 of the organic insulation layer 213, the fourth opening OP4 of the inter-insulation layer 212, and the fifth opening OP5 of the gate insulation layer 211 may define the transmission window TW.

The encapsulation layer 280 may be disposed on the second electrode 270. The encapsulation layer 280 may include at least one inorganic layer and at least one organic layer.

A portion of the encapsulation layer 280 overlapping the first pixel area PA1, the first peripheral area SA1, the second pixel area, and the second peripheral area may be disposed on the light-emitting element EL, prevent impurities flowing into the light-emitting element EL from the outside, and protect the light-emitting element EL from external impact. In an embodiment, the second pixel area and the second peripheral area may be structures substantially similar to those of the first pixel area PA1 and the first peripheral area SA1. Also, a portion of the encapsulation layer 280 overlapping the transmission area TA may fill the transmission window TW. The encapsulation layer 280 may have a flat top surface over the first pixel area PA1, the first peripheral area SA1, and the transmission area TA.

In an embodiment, the encapsulation layer 280 may include a first inorganic layer, a second inorganic layer disposed on the first inorganic layer, and an organic layer disposed between the first inorganic layer and the second inorganic layer. The first inorganic layer and the second inorganic layer may reduce or substantially block penetration of impurities such as oxygen and moisture into the light-emitting device EL. The organic layer may improve the sealing characteristics of the encapsulation layer 280, relieve internal stress of the first inorganic layer and the second inorganic layer, compensate defects of the first inorganic layer and the second inorganic layer, and provide a flat top surface to the second inorganic layer.

As described with reference to FIGS. 2 to 4, in the display panel 200, the area to be inspected by the apparatus for inspecting the display panel 100 may be the first region A1 having light-transmitting properties. In this case, even when the plurality of display panels 200 are manufactured through the same manufacturing process, a birefringence of the first area A1 may vary for each manufactured display panel 200. Accordingly, when the apparatus for inspecting the display panel 100 inspects the display panels 200 under a predetermined condition, an image forming defect in which the interference fringe does not appear or appears faintly in some of the display panels 200 may occur. Also, in order to solve this problem, even when the interference fringe is photographed while tilting the display panels 200 at various angles, the imaging defect may not be completely eliminated, and a problem that the interference fringe becomes non-uniform due to vibration of the display panel 200 due to an increase in inspection time and tilting.

However, the apparatus for inspecting the display panel 100 in the embodiment of the disclosure may acquire the interference fringe image by rotating the wave plate 130 disposed between the half mirror 120 and the reflective mirror 160 and having a predetermined period in a fixed state in which the display panel 200 is not rotated. In an embodiment, the imaging detector 170 may acquire the first image and the second image by photographing the interference fringes by the first beam L2*a* and the second beam L2*b* before and after the rotator 140 rotates the wave plate 130, respectively, for example. The angle at which the rotator 140 rotates the wave plate 130 may be set to an appropriate value according to the display panel 200 so that the interference fringe appears clearly in at least one of the first image and the second image. Accordingly, the apparatus for inspecting the display panel 100 may prevent the image forming defect in which the interference fringe does not appear or appears faintly, and may reduce an inspection time. Also, as the display panel 200 is fixed, erroneous measurement due to vibration of the display panel 200 may be prevented. Accordingly, the light-transmitting area of the display panel 200 may be accurately inspected, and the inspection time may be reduced.

Figure 5:
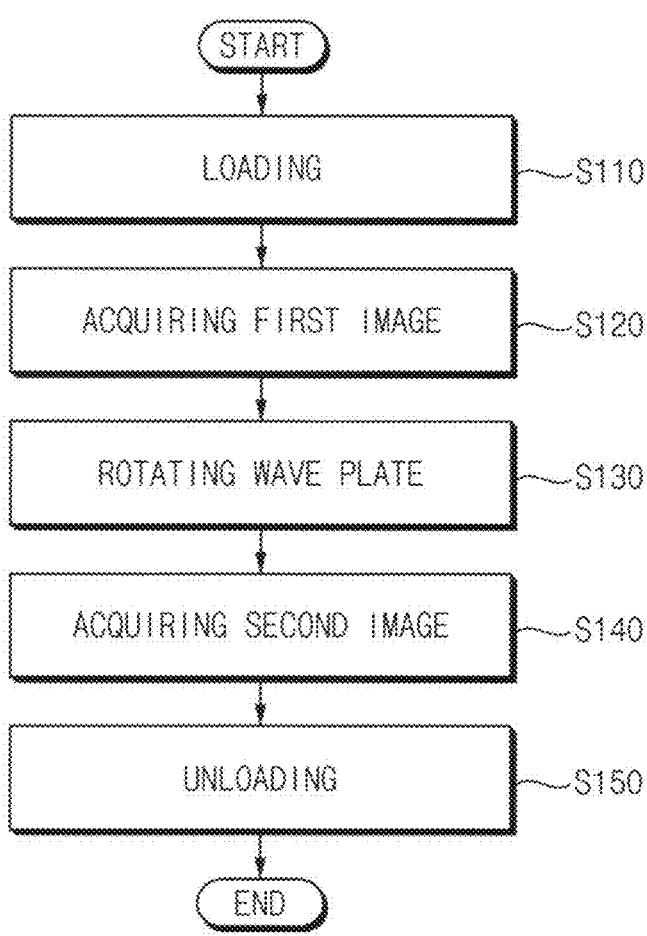
FIG. 5 is a flowchart illustrating an embodiment of a method for inspecting a display panel.

FIG. 5 is a flowchart illustrating an embodiment of a method for inspecting a display panel.

Hereinafter, a method for inspecting a display panel 200 using the apparatus for inspecting the display panel 100 will be briefly described with reference to FIGS. 1 and 5.

First, the display panel 200 to be inspected may be loaded onto the panel supporter 150 (S110).

The panel supporter 150 may support the display panel 200 such that the display panel 200 is disposed between the half mirror 120 and the reflective mirror 160. The panel supporter 150 may be fixed so that the display panel 200 is not rotated during the inspection process of the display panel 200.

Subsequently, the first image obtained by capturing the interference fringe of the light-transmitting area (e.g., the first area A1 of FIG. 2) of the display panel 200 may be acquired (S120).

The light source 110 may generate a source beam L1 and irradiate the source beam L1 toward the half mirror 120.

The half mirror 120 may reflect the first beam L2a which is a portion of the source beam L1 irradiated from the light source 110 and transmit the second beam L2b which is another portion of the source beam L1.

The first beam L2a may be reflected from the half mirror 120 to be incident on the imaging detector 170. The second beam L2b may transmit the half mirror 120, the wave plate 130, and the display panel 200, be reflected by the reflective mirror 160, again transmit the display panel 200, the wave plate 130 and the half mirror 120, and be incident on the imaging detector 170. The imaging detector 170 may acquire the first image by imaging an interference fringe by the first beam L2a and the second beam L2b.

Then, the rotator 140 may rotate the wave plate 130 at a predetermined angle (S130). In an embodiment, the rotator 140 may rotate the wave plate 130 at the predetermined angle about a rotation axis perpendicular to a top surface of the wave plate 130, for example.

After the rotator 140 rotates the wave plate 130 by the predetermined angle, the second image obtained by photographing the interference fringe of the light transmitting area of the display panel 200 may be acquired (S140).

The angle at which the rotator 140 rotates the wave plate 130 may be set to an appropriate value according to the display panel 200 (e.g., according to product specifications) so that the interference fringe appears clearly in at least one of the first image and the second image. Accordingly, the apparatus for inspecting the display panel 100 may prevent an image forming defect in which an interference fringe does not appear or appears faintly.

After acquiring the second image, the display panel 200 may be unloaded from the panel supporter 150 (S150).

According to the method for inspecting the display panel in the embodiments of the disclosure, while the wave plate 130 disposed between the half mirror 120 and the reflective mirror 160 and having a predetermined period in a fixed state is rotated by the predetermined angle, in which the display panel 200 is not rotated, the interference fringe image may be obtained. Accordingly, the method for inspecting the display panel may prevent an image forming defect in which an interference fringe does not appear or appears faintly, and may reduce the inspection time. Also, as the display panel 200 is fixed, erroneous measurement due to vibration of the display panel 200 may be prevented.

The apparatus and the method in the embodiments may be applied to a display device included in a computer, a notebook, a mobile phone, a smartphone, a smart pad, a portable media player ("PMP"), a personal digital assistance ("PDA"), an MP3 player, or the like.

Although the apparatus and the method in the embodiments have been described with reference to the drawings, the illustrated embodiments are examples, and may be modified and changed by a person having ordinary knowledge in the relevant technical field without departing from the technical spirit described in the following claims.

What is claimed is:

1. An apparatus for inspecting a display panel, the apparatus comprising:
   a light source;
   a half mirror directly receiving a source beam from the light source and reflecting, by an upper surface of the half mirror directly facing the light source, a first beam which is a portion of a source beam irradiated from the light source and transmitting a second beam which is another portion of the source beam toward the display panel;
   a reflective mirror reflecting the second beam transmitting the half mirror and the display panel to return to the half mirror;
   a panel supporter supporting the display panel between the half mirror and the reflective mirror;
   a wave plate disposed between the half mirror and the reflective mirror and transmitting the second beam;
   a rotator rotating the wave plate at a predetermined angle; and
   an imaging detector directly receiving the first beam from the upper surface of the half mirror and photographing an interference fringe by the first beam and the second beam.

2. The apparatus of claim 1, wherein the panel supporter fixes the display panel not to rotate.

3. The apparatus of claim 1, wherein the imaging detector photographs the interference fringe by the first beam and the second beam, wherein the first beam is reflected by the half mirror, and the second beam transmits the half mirror, the wave plate, and the display panel, is reflected by the reflective mirror, and again transmits the display panel, the wave plate, and the half mirror.

4. The apparatus of claim 3, wherein the imaging detector acquires a first image obtained by photographing the interference fringe by the first beam and the second beam before the wave plate is rotated at the predetermined angle, and acquires a second image obtained by photographing the interference fringe by the first beam and the second beam after the wave plate is rotated at the predetermined angle.

5. The apparatus of claim 1, wherein the wave plate is disposed between the half mirror and the display panel.

6. The apparatus of claim 1, wherein the wave plate is disposed between the display panel and the reflective mirror.

7. The apparatus of claim 1, wherein the light source irradiates a circularly polarized source beam.

8. The apparatus of claim 1, wherein the reflective mirror is inclined with respect to the half mirror.

* * * * *